(12) United States Patent
Deki et al.

(10) Patent No.: US 8,285,092 B2
(45) Date of Patent: Oct. 9, 2012

(54) OPTICAL WAVEGUIDE AND SPOT SIZE CONVERTER USING THE SAME

(75) Inventors: Yukari Deki, Tokyo (JP); Morio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 12/531,899

(22) PCT Filed: Mar. 7, 2008

(86) PCT No.: PCT/JP2008/054123
§ 371 (c)(1),
(2), (4) Date: Sep. 18, 2009

(87) PCT Pub. No.: WO2008/114624
PCT Pub. Date: Sep. 25, 2008

(65) Prior Publication Data
US 2010/0040327 A1 Feb. 18, 2010

(30) Foreign Application Priority Data
Mar. 20, 2007 (JP) .................................. 2007-072594

(51) Int. Cl.
*G02B 6/26* (2006.01)
(52) U.S. Cl. ............................................ 385/28; 385/43
(58) Field of Classification Search ................... 385/14, 385/28, 42, 43, 50
See application file for complete search history.

(56) References Cited

U.S. PATENT DOCUMENTS
7,215,846 B1 * 5/2007 Deliwala ....................... 385/28
(Continued)

FOREIGN PATENT DOCUMENTS
JP 3-081740 A 4/1991
(Continued)

OTHER PUBLICATIONS

International Search Report for PCT/JP2008/054123 mailed Apr. 22, 2008.

*Primary Examiner* — Frank Font

(57) ABSTRACT

An optical waveguide includes a substrate in the shape of a flat plate; lower clad that is disposed on the substrate; and a core that is disposed on the lower clad and transmits light. The optical waveguide includes a first optical waveguide and a second optical waveguide. The first optical waveguide includes a first core on the lower clad, and is disposed so as to extend along a direction in which the light travels to a first position. The second optical waveguide includes a second core on the lower clad, is disposed so as to extend along a direction in which the light travels to a second position, and has a lower relative refractive index difference than the first optical waveguide. The first optical waveguide and the second optical waveguide form, between the first position and the second position, a layer structure where the first core and the second core are disposed such that the first core is positioned a predetermined distance away from the second core in a direction perpendicular to the substrate. At least either the first optical waveguide or the second optical waveguide includes a mode coupling section and a mode conversion section. The mode coupling section includes a directional coupler to conduct the mode coupling of the first core and the second core between the first position and the second position. The mode conversion section is connected to the mode coupling section, and has a tapered core structure to adjust the mode diameter of the first core to the mode diameter of the second core.

12 Claims, 3 Drawing Sheets

U.S. PATENT DOCUMENTS

2003/0035632 A1* 2/2003 Glebov et al. ............ 385/43
2003/0081922 A1* 5/2003 Ide ........................... 385/129

FOREIGN PATENT DOCUMENTS

| | | | |
|---|---|---|---|
| JP | 4-015604 A | 1/1992 |
| JP | 5-243679 A | 9/1993 |
| JP | 5-249331 A | 9/1993 |
| JP | 6-027334 A | 2/1994 |
| JP | 2000162457 A | 6/2000 |
| JP | 2000235128 A | 8/2000 |
| JP | 2001337252 A | 12/2001 |
| JP | 3318406 B | 6/2002 |
| JP | 2002258078 A | 9/2002 |
| JP | 3450068 B | 7/2003 |
| JP | 2004503800 A | 2/2004 |
| JP | 2004309807 A | 11/2004 |
| JP | 3663310 B | 4/2005 |
| JP | 2005115017 A | 4/2005 |
| JP | 2006014612 A | 1/2006 |
| JP | 200614212 A | 6/2006 |

\* cited by examiner

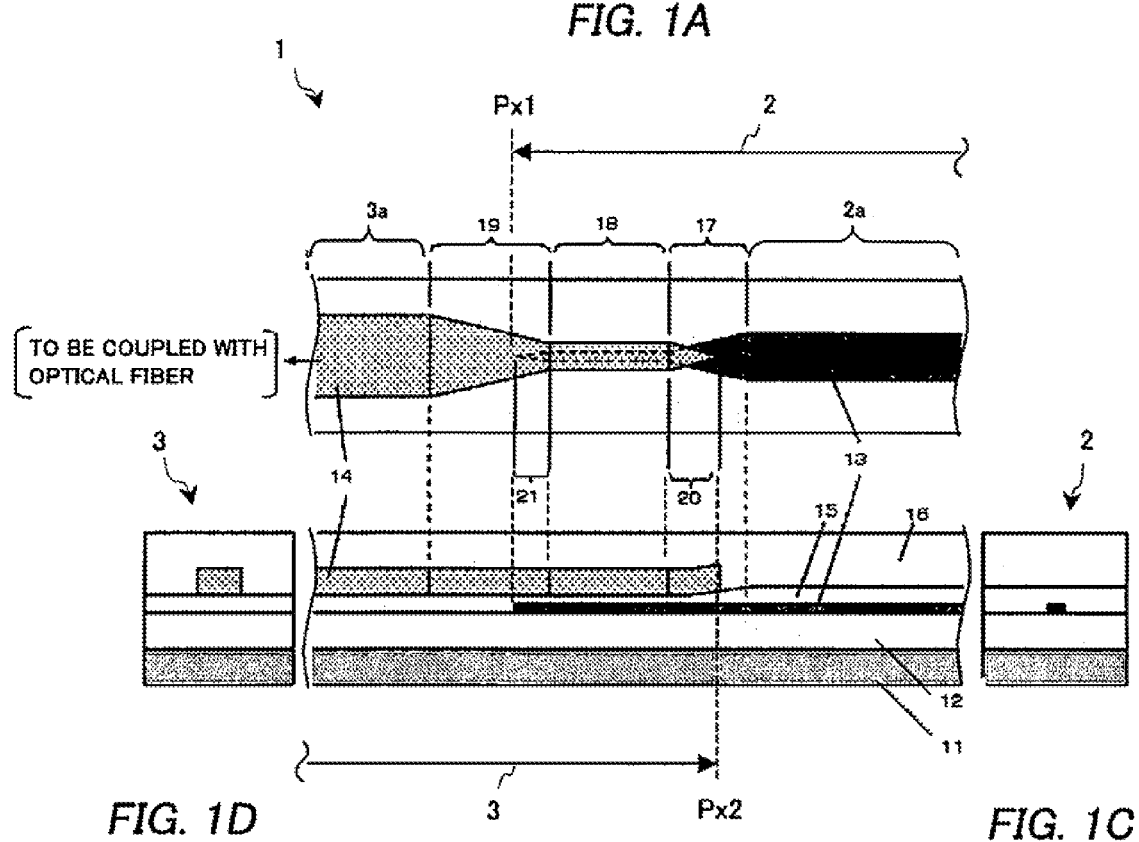

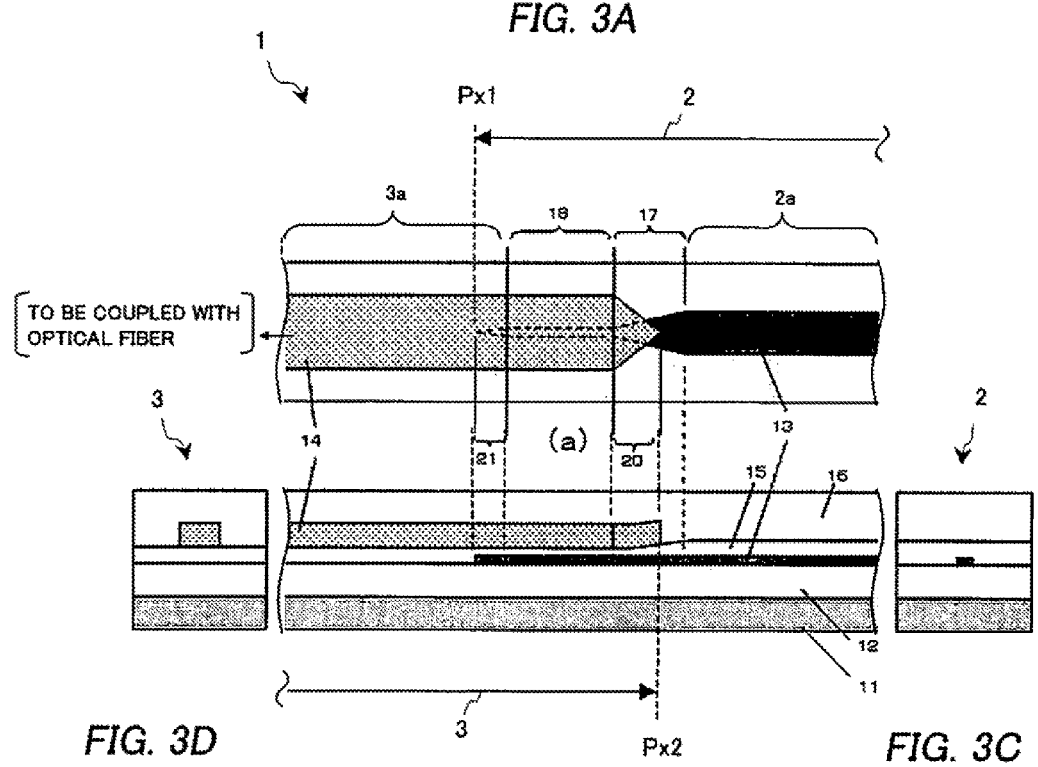

OPTICAL WAVEGUIDE AND SPOT SIZE CONVERTER USING THE SAME

This application is the National Phase of PCT/JP2008/054123, filed Mar. 7, 2008, which is based upon and claims the benefit of priority from Japanese patent application No. 2007-072594, filed on Mar. 20, 2007, the disclosure of which is incorporated herein its entirety by reference.

TECHNICAL FIELD

The present invention relates to an optical waveguide and a spot size converter using the same, and particularly relates to the shape of the optical waveguide to be coupled with an optical fiber and an idea about the structure of the optical waveguide.

BACKGROUND ART

As communication technologies have advanced in recent years, various kinds of development have been conducted on an optical circuit which is part of an optical communication system. Since a planar lightwave circuit is excellent in terms of improving functions, downsizing and lowering costs, expectations are running high for an optical waveguide device.

In the optical waveguide device, in order to couple the optical waveguide with the optical fiber in a highly efficient manner, the mode of the optical waveguide needs to match the mode of the optical fiber. In general, compared with the optical fiber, the relative refractive index difference $\Delta$ of the optical waveguide is large, and the mode diameter of the optical waveguide is small. Here, using a core refractive index $n1$ and a clad refractive index $n2$, the relative refractive index difference $\Delta$ is represented as follows: $\Delta=(n1-n2)/n1$. Moreover, when the light intensity distribution of guided-wave light can be approximated by Gaussian, the mode diameter is a diameter (MFD: Mode Field Diameter) of a portion where the light intensity becomes $1/e^2$ (e is the base of natural logarithm) with respect to a maximum value of the light intensity (which usually corresponds to the central portion of the core).

The general idea is to make the mode diameter of the optical fiber close to the mode diameter of the optical waveguide (see Patent Document 1, for example). However, changing the mode diameter of the optical fiber is difficult especially in the case of a multi-channel fiber array. Even if it is possible, costs are extremely high. Accordingly, in the past, only an optical waveguide pattern has been changed in order to realize low-loss coupling (see Patent Documents 2 to 8 and the like, for example).

However, $\Delta$ of the optical waveguide gradually increases as the optical waveguide device is downsized, and the processing size of the optical waveguide needs to be ultrafine and highly accurate according to the above method. Therefore, it is becoming difficult to adjust the mode diameter to that of the optical fiber.

Accordingly, one of the methods to enlarge the mode diameter by changing the structure of the optical waveguide is to form a new optical waveguide whose $\Delta$ is an intermediate value between those of the optical waveguide and the optical fiber such that the new optical waveguide is inserted between the optical waveguide and the optical fiber (see Patent Documents 9 to 12 and the like, for example).

Patent Document 1: Japanese Patent No. 3,318,406
Patent Document 2: JP-A-06-027334
Patent Document 3: Japanese Patent No. 3,663,310
Patent Document 4: JP-A-2000-235128
Patent Document 5: JP-A-2001-337252
Patent Document 6: JP-A-2002-258078
Patent Document 7: JP-A-2005-115017
Patent Document 8: JP-A-2006-146212
Patent Document 9: JP-A-05-249331
Patent Document 10: Japanese Patent No. 3450068
Patent Document 11: JP-A-04-015604
Patent Document 12: JP-A-03-081740

SUMMARY OF INVENTION

Technical Problem

However, any one of the above relevant techniques cannot sufficiently reduce coupling loss. That is, the above techniques have problems about costs and reproducibility due to the complexity of formation methods, about the structure in which reflection occurs at an end face due to the mismatching of refractive index, and about the adjustment of optical axes due to two or more waveguides which can receive light for the optical fiber. Therefore, there is no spot size converter that can obtain a sufficient characteristic. Accordingly, to solve such problems, a new optical waveguide and a new high-efficiency coupling method for the optical fiber are required.

The object of the present invention is to solve the above problems and to realize high-efficiency coupling when the optical waveguide is coupled with the optical fiber.

Solution to Problem

To achieve the above object, according to the present invention, an optical waveguide includes a substrate in the shape of a flat plate, lower clad that is disposed on the substrate, and a core that is disposed on the lower clad and transmits light. The optical waveguide includes: a first optical waveguide that includes a first core on the lower clad as the core, and is disposed so as to extend along a direction in which the light travels to a first position of the optical waveguide; and a second optical waveguide that includes a second core on the lower clad as the core, is disposed so as to extend along a direction in which the light travels to a second position of the optical waveguide, and has a lower relative refractive index difference than the first optical waveguide. The first optical waveguide and the second optical waveguide form, between the first position and the second position, a layer structure where the first core and the second core are disposed such that the first core is positioned a predetermined distance away from the second core in a direction perpendicular to the substrate. At least either the first optical waveguide or the second optical waveguide includes: a mode coupling section that includes a directional coupler to conduct the mode coupling of the first core and the second core between the first position and the second position; and a mode conversion section that is connected to the mode coupling section, and has a tapered core structure to adjust the mode diameter of the first core to the mode diameter of the second core.

Advantageous Effects of Invention

According to the present invention, when the optical waveguide is coupled with the optical fiber, coupling can be done in a highly efficient manner.

BRIEF DESCRIPTION OF DRAWINGS

FIG. 1 is a diagram illustrating the schematic configuration of an optical waveguide according to a first example of the present invention: FIG. 1A is a cross-sectional view of upper-surface essential components; FIG. 1B is a cross-sectional view of plain-surface essential components; FIG. 1C is a cross-sectional view of right-side-surface essential components; and FIG. 1D is a cross-sectional view of left-side-surface essential components.

FIG. 2 is a diagram illustrating the schematic configuration of an optical waveguide according to a second example of the present invention.

FIG. 3 is a diagram illustrating the schematic configuration of an optical waveguide according to a third example of the present invention: FIG. 3A is a cross-sectional view of upper-surface essential components; FIG. 3B is a cross-sectional view of plain-surface essential components; FIG. 3C is a cross-sectional view of right-side-surface essential components; and FIG. 3D is a cross-sectional view of left-side-surface essential components.

REFERENCE SIGNS LIST

Figures 2A, 2B, 2C, 2D:
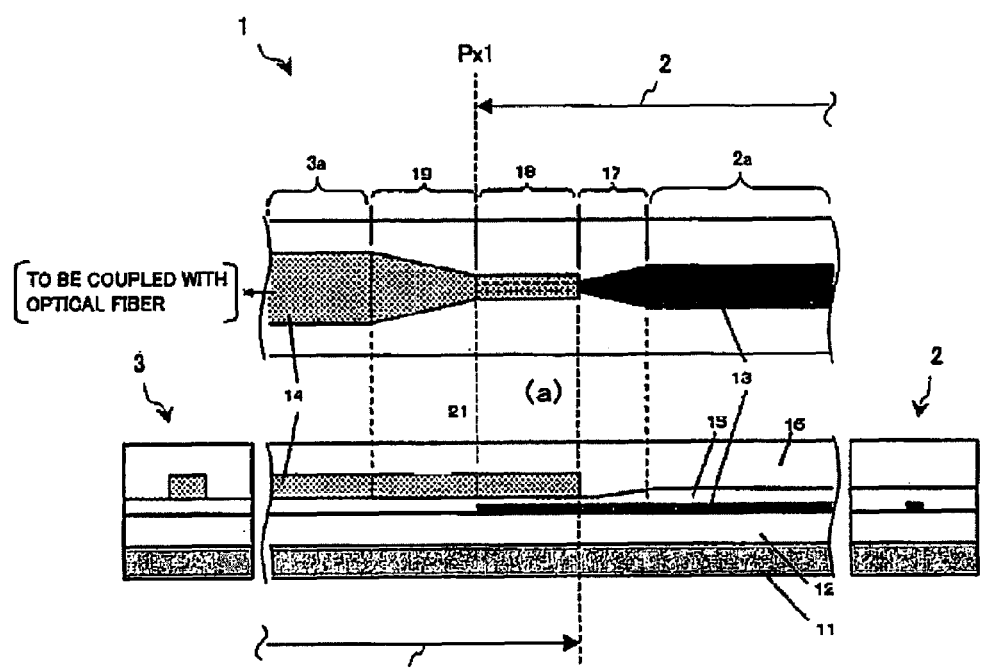
FIG. 2A is a cross-sectional view of upper-surface essential components.
FIG. 2B is a cross-sectional view of plain-surface essential components.
FIG. 2C is a cross-sectional view of right-side-surface essential components.
FIG. 2D is a cross-sectional view of left-side-surface essential components.

1: Optical waveguide
2: High Δ optical waveguide (First optical waveguide)
2a: First linear waveguide section
3: Low Δ optical waveguide (Second optical waveguide)
3a: Second linear waveguide section
11: Si substrate
12: Lower clad
13: High Δ core (First core)
14: Low Δ core (Second core)
15: Reflow layer
16: Upper clad
17: First mode conversion section
18: Mode coupling section
19: Second mode conversion section
20: Second reflection-free termination section
21: First reflection-free termination section

DESCRIPTION OF EMBODIMENTS

The following describes an exemplary embodiment of the present invention with reference to the accompanying drawings.

The present exemplary embodiment uses a spot size converter in which the shape and structure of an optical waveguide is changed. Therefore, the present exemplary embodiment realizes the high-efficiency coupling of the optical waveguide and the optical fiber, and the high-efficiency coupling between the optical waveguides. Particularly, the present exemplary embodiment couples the optical waveguide having a high relative refractive index difference Δ and a single mode fiber (SMF) for optical communication together in a highly efficient manner.

Accordingly, the spot size converter using the optical waveguide of the present exemplary embodiment has the structure of a planar optical waveguide, including at least a substrate in the shape of a flat plate; lower clad provided on the substrate; and a core disposed on the lower clad. The core contains at least two types of cores: an optical waveguide having a high relative refractive index difference (a high Δ optical waveguide), and an optical waveguide having a low relative refractive index difference (a low Δ optical waveguide). In an area where the cores are coupled together, a layer structure is formed in a direction perpendicular to the substrate with the high Δ optical waveguide separated a predetermined distance away from the low Δ optical waveguide. At least one of the cores has: a mode conversion section (a mode converter portion), which adjusts the mode diameter of the core to that of the other core using the tapered structure; and a mode coupling section (a mode coupling portion), which couples the core with the other core using a directional coupler.

According to the above configuration, both the high Δ optical waveguide and the low Δ optical waveguide may have the mode conversion section and the mode coupling section. Moreover, at least either the high Δ optical waveguide or the low Δ optical waveguide may have a tapered reflection-free termination structure the width of which becomes thinner toward the tip. Moreover, both the high Δ optical waveguide and the low Δ optical waveguide may have the tapered reflection-free termination structure the width of which becomes thinner toward the tip. Furthermore, when the layer structure is formed by the high Δ optical waveguide and the low Δ optical waveguide in the direction perpendicular to the substrate, the mode coupling may be realized with the high Δ optical waveguide serving as a lower layer and the low Δ optical waveguide serving as an upper layer.

As described above, according to the present exemplary embodiment, the new low Δ optical waveguide the relative refractive index difference Δ of which is a value intermediate between that of the high Δ optical waveguide and that of the optical fiber is inserted and formed, and the mode diameters are adjusted to each other in the areas where the waveguides and the optical fiber are coupled together. Since the spot size converter to be used has the multilayer structure of a directional coupler in which a buffer is provided between the high Δ optical waveguide and the low Δ optical waveguide, high-efficiency coupling is realized.

Accordingly, the present exemplary embodiment presents the following effects.

The first effect is to make it easier to adjust the mode diameters to each other by providing the low Δ optical waveguide, which is an intermediate portion between the high Δ optical waveguide and the optical fiber, as an intermediate Δ. Therefore, power can be transferred from the high Δ waveguide to the low Δ waveguide while the loss of the power is being kept low. Furthermore, the low Δ waveguide and the optical fiber can be coupled together using a conventional taper which gets thicker toward the tip or a conventional taper which gets thinner toward the tip while the loss of the power is being kept low. By dividing the coupling process into two steps, it becomes easier to adjust the mode diameters to each other. As a result, high-efficiency coupling can be achieved.

The second effect is attributable to the separation of the mode conversion section from the mode coupling section. Unlike conventional arts, the object of the mode coupling section for the optical waveguides is to maintain a stable mode: before light reaches the mode coupling section, mode conversion is carried out so that each waveguide has the same mode diameter, and then optical power is transferred at the mode coupling section. Thanks to the above structure, the spot size converter to be formed is robust against some changes in gap and differences in size between the waveguides.

The third effect is that the high Δ optical waveguide does not directly appear on the end face of an optical device because the low Δ optical waveguide is sandwiched between the optical fiber and the high Δ optical waveguide. Since the high Δ optical waveguide does not directly appear on the end face of the optical device, the end-face reflection (Fresnel reflection), which can be caused by the difference in refractive index, hardly occurs. That is, the effect of returning light by the end-face reflection can be suppressed. Furthermore, another effect of the high Δ optical waveguide that does not directly appear on the end face of the optical device is that there is one light-outgoing end to be observed at the end face. If there is a plurality of cores to be observed at the end face, it becomes difficult to deal with the alignment of the optical axes because the optical axes are prone to diverge from one another. However, the present exemplary embodiment also has the following characteristic: Since there is only one light-outgoing end, the optical axes hardly diverge from one another.

The following describes specific examples of the present invention.

EXAMPLE 1

FIG. 1 is a schematic diagram which schematically illustrates an example of the configuration of a spot size converter that uses an optical waveguide 1 according to a first example of the present invention. FIG. 1A is a cross-sectional view of upper-surface essential components. FIG. 1B is a cross-sectional view of plain-surface essential components. FIG. 1C is a cross-sectional view of right-side-surface essential components. FIG. 1D is a cross-sectional view of left-side-surface essential components. Incidentally, FIGS. 1A and 1B show the cross-section surface of an essential portion of the optical waveguide 1. As indicated by undulating lines in the diagram, both ends of the optical waveguide 1 are not limited to the end faces of an actual waveguide chip. Moreover, in the case of the example illustrated by the diagram, the optical waveguide 1 is coupled with the optical fiber. Alternatively, the optical waveguide 1 may be applied in other cases, such as when the optical waveguide 1 is coupled with, for example, SOA (Semiconductor Optical Amplifier) or LD (Laser Diode) instead of the optical fiber.

The optical waveguide 1 shown in FIGS. 1A to 1D extends in a direction parallel to the plane surface of a Si substrate 11 in the shape of a flat plate. The optical waveguide 1 includes lower clad 12, which is disposed on the Si substrate 11; a core, which is disposed on the lower clad 12 and transmits light; and upper clad 15, which is disposed on the core. As described later, the core is a two-layer core, i.e. a lower-layer high Δ core (first core) 13 and an upper-layer low Δ core (second core) 14 disposed at different positions in a direction perpendicular to the Si substrate 11 via a reflow layer (buffer) 15.

Thanks to the two-layer core structure, the optical waveguide 1 includes a high Δ optical waveguide (first optical waveguide) 2 having a high Δ core 13, and a low Δ optical waveguide (second optical waveguide) 3. The high Δ optical waveguide 2 is disposed so as to extend along a direction in which the light travels to a first position P1 of the optical waveguide 1. The relative refractive index difference Δ of the high Δ optical waveguide 2 is higher than the relative refractive index difference Δ of the optical fiber. The low Δ optical waveguide 3 is disposed so as to extend along a direction in which the light travels to a second position P2 of the optical waveguide 1. The difference Δ of the low Δ optical waveguide 3 is higher than the difference Δ of the optical fiber but lower than the difference Δ of the high Δ optical waveguide.

The high Δ optical waveguide 2 and the low Δ optical waveguide 3 form a layer structure between the first position P1 and the second position P2: The high Δ core 13 and the low Δ core 14 are disposed such that the high Δ core 13 is positioned a predetermined distance away from the low Δ core 14 via the reflow layer 15 in a direction perpendicular to the Si substrate 11. According to the above layer structure, the high Δ optical waveguide 2 is disposed on the lower layer, and the low Δ optical waveguide 3 is disposed on the upper layer. The reflow layer 15 serves as a between-waveguide gap (buffer) between the high Δ optical waveguide 2 and the low Δ optical waveguide 3.

The high Δ optical waveguide 2 and the low Δ optical waveguide 3 include, between the first position P1 and the second position P2, a mode coupling section (complete coupling section) 18 that contains a directional coupler to conduct the mode coupling of the high Δ core 13 and the low Δ core 14.

The high Δ optical waveguide 2 is, for example, connected to various optical circuits not shown in the diagram. The high Δ optical waveguide 2 includes a linearly-extending first linear waveguide section 2a; a first mode conversion section (mode converter) 17, which is sequentially connected to the first linear waveguide section 2a and the mode coupling section 18 so as to exist therebetween and has a tapered core structure to adjust the mode diameter of the high Δ core 13 to the mode diameter of the low Δ core 14; and a first reflection-free termination section 21, which is sequentially connected to the tip of the mode coupling section 18 and has a tapered core structure the width of which becomes thinner toward the tip.

The low Δ optical waveguide 3 is, in the example of FIG. 1, connected to the optical fiber. The low Δ optical waveguide 3 includes a linearly-extending second linear waveguide section 3a; a second mode conversion section (mode converter) 19, which is sequentially connected to the second linear waveguide section 3a and the mode coupling section 18 so as to exist therebetween and has a tapered core structure to adjust the mode diameter of the low Δ core 14 to the mode diameter of the high Δ core 13; and a second reflection-free termination section 20, which is sequentially connected to the tip of the mode coupling section 18 and has a tapered core structure the width of which becomes thinner toward the tip.

In the example of FIG. 1, the low Δ optical waveguide 3 is connected to the optical fiber. However, in the example, the low Δ optical waveguide 3 can be applied in other cases, such as when the low Δ optical waveguide 3 is connected to the optical fiber via an optical circuit or a tapered spot size converter or when the low Δ optical waveguide 3 is directly connected to the optical fiber.

Quartz is used for the lower clad 12, the reflow layer 15, and the upper clad 16. The thickness of the lower clad 12 and the upper clad 16 is 15 μm. The thickness of the reflow layer 15 is 4 μm. The high Δ core 13 measures 3 μm square. The low Δ core 14 measures 5 μm square. The refractive indexes are in the following relation: the high Δ core 13>the low Δ core 14>the lower clad 12=the upper clad 16. As for the relative refractive index difference Δ, the high Δ is 2%, and the low Δ is 1%.

The high Δ core 13 is tapered in the first mode conversion section 17 such that the width of the waveguide changes from 3 μm to 0.7 μm. The mode of the high Δ core 13 is coupled with the mode of the low Δ core 14 at the mode coupling section 18. The low Δ core 14 is tapered in the second mode conversion section 19 such that the width of the waveguide changes from 5 μm to 2.5 μm. The mode of the low Δ core 14 is coupled with the mode of the high Δ core 13 at the mode coupling section 18.

Furthermore, as for the high Δ core 13, the first reflection-free termination section 21 is produced so as to follow the first mode conversion section 17 and the mode coupling section 18, thereby preventing the light which is not completely coupled from becoming the returning light. Similarly, as for the low Δ core 14, the second reflection-free termination section 20 is produced so as to follow the second mode conversion section 19 and the mode coupling section 18, thereby preventing the light which is not completely coupled from becoming the returning light.

With the above configuration, the optical waveguide 1 carries out mode coupling at the mode coupling section 18 after the mode diameter of the high Δ optical waveguide 2 is adjusted to the mode diameter of the low Δ optical waveguide 3 at the first mode conversion section 17 and the second mode conversion section 19. Therefore, coupling is possible while the loss of power is kept extremely low. As a result, the coupling loss of the low Δ core 14 and the high Δ core 13 is 0.1 dB. Moreover, the coupling loss of the low Δ core 14 and the single mode fiber is 0.3 dB when the low Δ core 14 is coupled with the single mode fiber because a taper with width of 0.7 μm which gets thinner toward the tip is formed for the low Δ core 14. Therefore, the total coupling loss, or the sum of both losses, from the high Δ core 13 to the single mode fiber is 0.1+0.3=0.4 dB.

On the contrary, in the case of direct connection from the high Δ core 13 to the single mode fiber instead of the above configuration, the loss is 4.0 dB if the high Δ core 13 remains unchanged with the waveguide width of 3 μm. If a taper with width of 0.7 μm which gets thinner toward the tip is formed at the coupling portion of the high Δ core 13, the coupling loss improves by 2.5 dB to 1.5 dB, which is still a large coupling loss. Incidentally, if the optical waveguide of the high Δ core 13 can be tapered such that the width gets thinner to 0.3 μm, coupling can be done with the coupling loss of 0.2 to 0.3 dB. However, in terms of production processes, it is extremely difficult to produce the optical waveguide with width of 0.3 μm. It is also difficult to achieve reproducibility. Therefore, it is desirable that even when a taper which gets thinner toward the end is used, the width of the optical waveguide to be used should be as large as possible to improve reproducibility.

Moreover, according to the present example, the reflow layer 15 serves as a between-waveguide gap at the mode coupling section 18. The predetermined distance can be maintained by using the reflow layer 15. Therefore, the stable spot size converter can be produced.

As described above, low-loss coupling is demonstrated with the use of the spot size converter having a multilayer structure.

Therefore, according to the present example, high-efficiency coupling is realized with the use of the spot size converter having the multilayer structure of a directional coupler in which the reflow layer 15 is provided between the high Δ optical waveguide 2 and the low Δ optical waveguide 3 as a buffer.

EXAMPLE 2

The following describes a second example of the present invention in detail with reference to the accompanying drawing.

FIG. 2 is a schematic diagram which schematically illustrates an example of the configuration of an optical waveguide 1 according to the present example. FIG. 2A is a cross-sectional view of upper-surface essential components. FIG. 2B is a cross-sectional view of plain-surface essential components. FIG. 2C is a cross-sectional view of right-side-surface essential components. FIG. 2D is a cross-sectional view of left-side-surface essential components.

The optical waveguide 1 of the present example shown in FIGS. 2A to 2D has the same basic configuration as the optical waveguide of the first example has. However, the difference between the present example and the first example is that the optical waveguide 1 of the present example does not have the first reflection-free termination section 21 and the second reflection-free termination section 20. The following describes the difference.

If complete coupling cannot be done at the time of mode coupling, the light is reflected by the end of the optical waveguide and returns as the returning light. Such reflection light affects a device as noise, leading to a possible reduction in performance of the device. Accordingly, it is desirable that the optical waveguide 1 be equipped with the reflection-free termination section like the first example. However, if mode coupling is perfectly done, there is substantially no effect of the reflection light. In such cases, there is especially no problem even if the optical waveguide 1 is not equipped with the reflection-free termination section. Therefore, the second example shows such a case. Here, the size of the waveguide and the like are the same as those of the first example.

Since the optical waveguide 1 produced has the above configuration, mode coupling is done after the mode diameter of the high Δ optical waveguide 2 is adjusted to the mode diameter of the low Δ optical waveguide 3. Therefore, coupling can be done while the loss of power is being kept extremely low. As a result, the coupling loss of the low Δ core 14 and the high Δ core 13 is 0.1 dB. Moreover, the coupling loss of the low Δ core 14 and the single mode fiber is 0.3 dB when the low Δ core 14 is coupled with the single mode fiber because a taper with width of 0.7 μm which gets thinner toward the tip is formed. Therefore, the total coupling loss from the high Δ core 13 to the single mode fiber is 0.4 dB, which is the same as the result of the first example.

As described above, according to the present example, low-loss coupling is demonstrated with the use of the spot size converter having a multilayer structure.

EXAMPLE 3

The following describes a third example of the present invention in detail with reference to the accompanying drawing.

FIG. 3 is a schematic diagram which schematically illustrates an example of the configuration of an optical waveguide according to the present example. FIG. 3A is a cross-sectional view of upper-surface essential components. FIG. 3B is a cross-sectional view of plain-surface essential components. FIG. 3C is a cross-sectional view of right-side-surface essential components. FIG. 3D is a cross-sectional view of left-side-surface essential components.

The optical waveguide 1 of the present example shown in FIGS. 3A to 3D has the same basic configuration as the optical waveguide of the first example has. However, the difference between the present example and the first example is that in the optical waveguide 1 of the present example, the mode conversion section 19 does not have a tapered portion. The following describes the difference.

The present example describes the case where mode coupling can be done with the low Δ core 14 whose mode is not converted and whose mode diameter remains the same as the mode diameter of the low Δ core 14 at the time of transmission. The high Δ core 13 is tapered at the first mode conversion section 17 such that the width of the waveguide changes from 3 μm to 0.6 μm. The mode of the high Δ core 13 is coupled with the mode of the low Δ core 14 at the mode coupling section 18. As for the low Δ core 14, the width of the waveguide remains unchanged at 5 μm at the second mode conversion section 19. The mode of the low Δ core 14 is coupled with the mode of the high Δ core 13 at the mode coupling section 18.

Since the optical waveguide 1 produced has the above configuration, mode coupling is done after the mode diameter of the waveguide 2 is adjusted to the mode diameter of the waveguide 3. Therefore, coupling can be done while the loss of power is being kept extremely low. Here, the coupling loss of the low Δ core 14 and the high Δ core 13 is 0.4 dB. Moreover, the coupling loss of the low Δ core 14 and the single mode fiber is 0.3 dB when the low Δ core 14 is coupled with the single mode fiber because a taper with width of 0.7 μm which gets thinner toward the tip is formed. Therefore, the total coupling loss from the high Δ core 13 to the single mode fiber is 0.7 dB.

As described above, according to the present example, low-loss coupling is demonstrated with the use of the spot size converter having a multilayer structure even though the present example may not be as good as the first example in some cases.

(Other Embodiment)

According to another exemplary embodiment of the present invention, an optical waveguide includes a substrate in the shape of a flat plate; lower clad that is disposed on the substrate; and a core that is disposed on the lower clad and transmits light. The optical waveguide includes a first optical waveguide and a second optical waveguide. The first optical waveguide includes a first core on the lower clad as a core, and is disposed so as to extend along a direction in which the light travels to a first position of the optical waveguide. The second optical waveguide includes a second core on the lower clad as a core, is disposed so as to extend along a direction in which the light travels to a second position of the optical waveguide, and has a lower relative refractive index difference than the first optical waveguide. The first optical waveguide and the second optical waveguide form, between the first position and the second position, a layer structure where the first core and the second core are disposed such that the first core is positioned a predetermined distance away from the second core in a direction perpendicular to the substrate. At least either the first optical waveguide or the second optical waveguide includes a mode coupling section and a mode conversion section. The mode coupling section includes a directional coupler to conduct the mode coupling of the first core and the second core between the first position and the second position. The mode conversion section is connected to the mode coupling section, and has a tapered core structure to adjust the mode diameter of the first core to the mode diameter of the second core. With the above configuration, in the optical waveguide, both the first optical waveguide and the second optical waveguide may have the mode conversion section and the mode coupling section.

In the optical waveguide having the above configuration, at least either the first optical waveguide or the second optical waveguide may include a reflection-free termination section having a tapered core structure the width of which gets thinner toward the tip near the tip of the mode coupling section.

In the optical waveguide having the above configuration, both the first optical waveguide and the second optical waveguide may include a reflection-free termination section having a tapered core structure the width of which gets thinner toward the tip near the tip of the mode coupling section.

In the optical waveguide having the above configuration, the first optical waveguide and the second optical waveguide may form, between the first position and the second position, a layer structure where the first core and the second core are respectively disposed on a lower layer and an upper layer in a direction perpendicular to the substrate; the mode coupling section may include a directional coupler to conduct the mode coupling of the first core disposed on the lower layer and the second core disposed on the upper layer between the first position and the second position.

According to another exemplary embodiment of the present invention, a spot size converter uses one of the above optical waveguides.

While the invention has been particularly shown and described with reference to the exemplary embodiments and examples thereof, the invention is not limited to these exemplary embodiments and examples. It will be understood by those of ordinary skill in the art that various changes in form and details may be made therein without departing from the spirit and scope of the present invention as defined by the claims.

Industrial Applicability

The present invention can be used for an optical waveguide to be coupled with an optical fiber and a multilayer spot size converter using the same, and be applied to a planer lightwave circuit constituting an essential component of an optical communication system, and the like.

The invention claimed is:

1. An optical waveguide including a substrate in the shape of a flat plate, lower clad that is disposed on the substrate, and a core that is disposed on the lower clad and transmits light, the optical waveguide comprising:
   a first optical waveguide that includes a first core on the lower clad as the core, and is disposed so as to extend along a direction in which the light travels to a first position of the optical waveguide; and
   a second optical waveguide that includes a second core on the lower clad as the core, is disposed so as to extend along a second direction in which the light travels to a second position of the optical waveguide, and has a lower refractive index difference than the first optical waveguide does, wherein:
   the first optical waveguide and the second optical waveguide form, between the first position and the second position, a layer structure where the first core and the second core are disposed such that the first core is positioned a predetermined distance away from the second core in a third direction perpendicular to the substrate; and
   at least either the first optical waveguide or the second optical waveguide includes:
   a mode coupling section that includes a directional coupler to conduct the mode coupling of the first core and the second core between the first position and the second position; and
   a mode conversion section that is connected to the mode coupling section, and has a tapered core structure to adjust the mode diameter of the first core to the mode diameter of the second core,
   wherein the second optical waveguide is sandwiched between an optical fiber and the first optical waveguide, such that the first optical waveguide is not positioned on an end face of the optical device.

2. The optical waveguide according to claim 1, wherein both the first optical waveguide and the second optical waveguide have the mode conversion section and the mode coupling section.

3. The optical waveguide according to claim 1, wherein at least either the first optical waveguide or the second optical waveguide includes a reflection-free termination section having a tapered core structure the width of which gets thinner toward the tip near the tip of the mode coupling section.

4. The optical waveguide according to claim 1, wherein
both the first optical waveguide and the second optical waveguide include a reflection-free termination section having a tapered core structure the width of which gets thinner toward the tip near the tip of the mode coupling section.

5. The optical waveguide according to claim 1, wherein:
the first optical waveguide and the second optical waveguide form, between the first position and the second position, a layer structure where the first core and the second core are respectively disposed on a lower layer and an upper layer in the third direction perpendicular to the substrate; and
the mode coupling section includes a directional coupler to conduct the mode coupling of the first core disposed on the lower layer and the second core disposed on the upper layer between the first position and the second position.

6. A spot size converter that uses one of the optical waveguides claimed in claim 1.

7. An optical waveguide including a substrate in the shape of a flat plate, a lower clad that is disposed on the substrate, and a core that is disposed on the lower clad and transmits light, the optical waveguide comprising:
a first optical waveguide that includes a first core on the lower clad as the core, and is disposed so as to extend along a first direction in which the light travels to a first position of the optical waveguide; and
a second optical waveguide that includes a second core on the lower clad as the core is disposed so as to extend along a second direction in which the light travels to a second position of the optical waveguide, and has a lower refractive index difference than the first optical waveguide does, wherein:
the first optical waveguide and the second optical waveguide form, between the first position and the second position, a layer structure where the first core and the second core are disposed such that the first core is positioned a predetermined distance away from the second core in a third direction perpendicular to the substrate; and
at least either the first optical waveguide or the second optical waveguide includes:

a mode coupling section that includes a directional coupler to conduct the mode coupling of the first core and the second core between the first position and the second position; and
a mode conversion section that is connected to the mode coupling section, and has a tapered core structure to adjust a mode diameter of the first core to the mode diameter of the second core,
wherein the mode conversion section is separated from the mode coupling section, and the mode coupling section maintains a stable mode in which before light reaches the mode coupling section, mode conversion is carried out so that the first optical waveguide and the second optical waveguide have an identical mode diameter.

8. The optical waveguide according to claim 7, wherein
both the first optical waveguide and the second optical waveguide have the mode conversion section and the mode coupling section.

9. The optical waveguide according to claim 7, wherein
at least either the first optical waveguide or the second optical waveguide includes a reflection-free termination section having a tapered core structure the width of which gets thinner toward the tip near the tip of the mode coupling section.

10. The optical waveguide according to claim 7, wherein
both the first optical waveguide and the second optical waveguide include a reflection-free termination section having a tapered core structure the width of which gets thinner toward the tip near the tip of the mode coupling section.

11. The optical waveguide according to claim 7, wherein:
the first optical waveguide and the second optical waveguide form, between the first position and the second position, a layer structure where the first core and the second core are respectively disposed on a lower layer and an upper layer in the third direction perpendicular to the substrate; and
the mode coupling section includes a directional coupler to conduct the mode coupling of the first core disposed on the lower layer and the second core disposed on the upper layer between the first position and the second position.

12. A spot size converter that uses one of the optical waveguides claimed in claim 7.

* * * * *